Sept. 14, 1943.    G. MAURER    2,329,549
CLIPPING MACHINE
Filed April 1, 1942    5 Sheets-Sheet 1
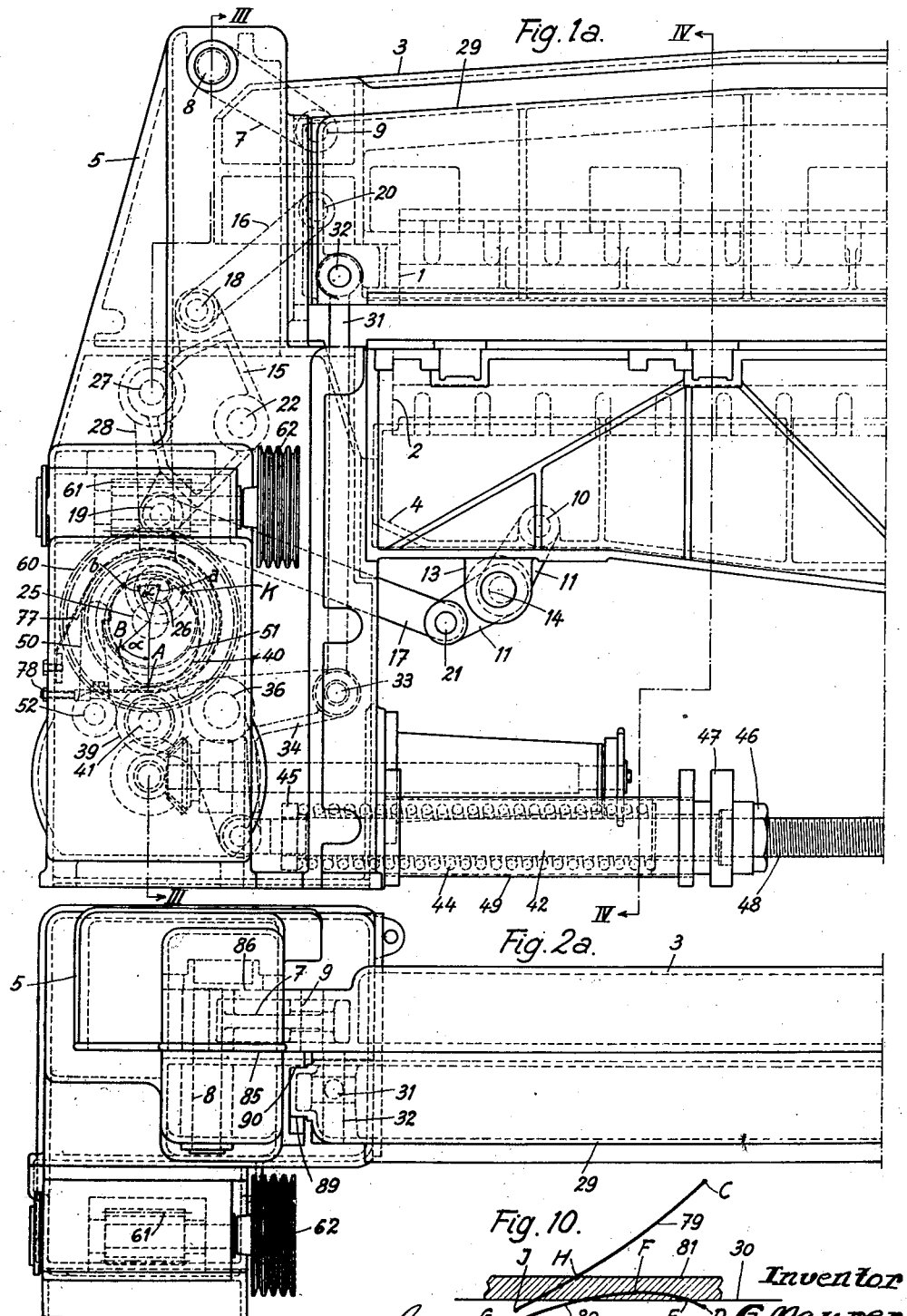

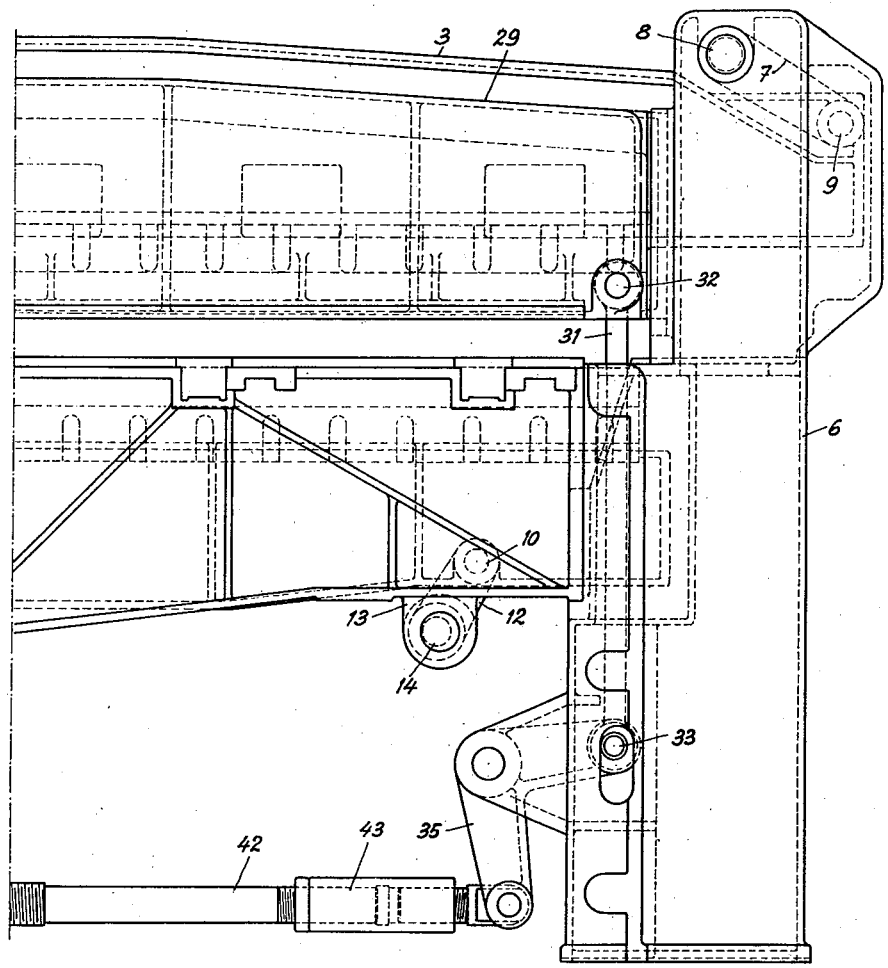
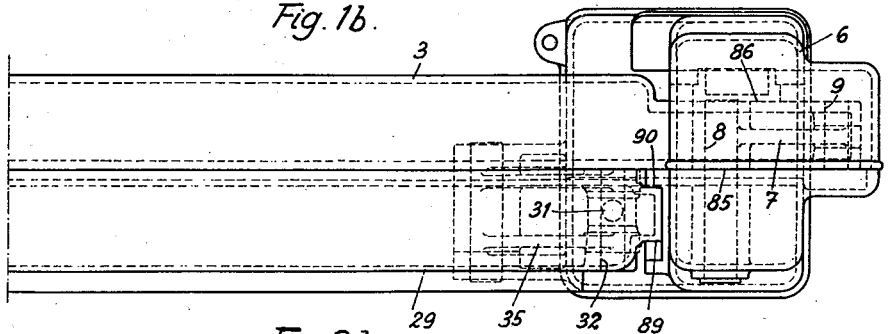

Sept. 14, 1943.  G. MAURER  2,329,549
CLIPPING MACHINE
Filed April 1, 1942   5 Sheets-Sheet 3

Inventor
G. Maurer
By Glascock Downing & Rudola Attys

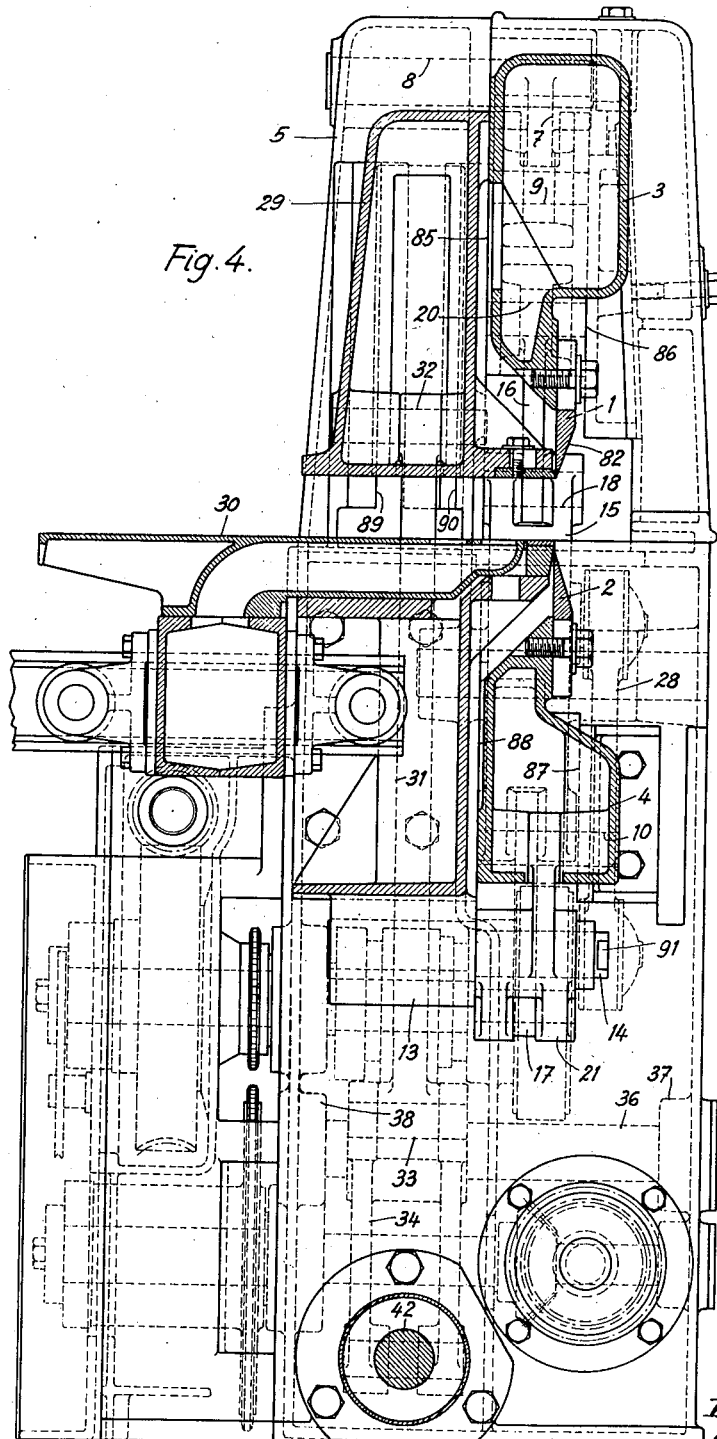

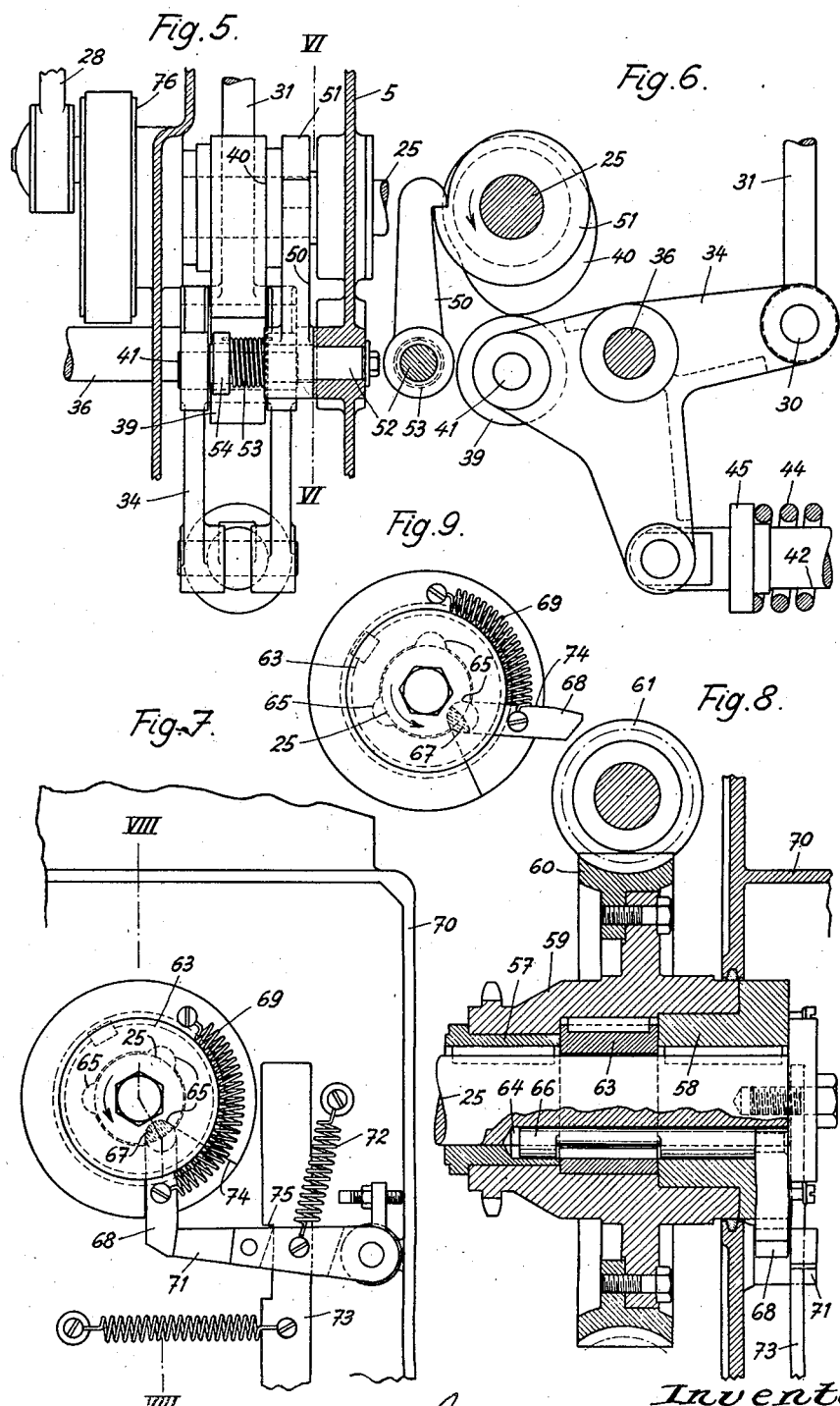

UNITED STATES PATENT OFFICE 2,329,549

CLIPPING MACHINE

Gottfried Maurer, Zurich, Switzerland, assignor to A. Müller & Cie, Maschinenfabrik und Eisengiesserei, Aktiengesellschaft, Brugg, Switzerland, a joint-stock company of Switzerland Application April 1, 1942, Serial No. 437,291
In Switzerland February 27, 1941

5 Claims. (Cl. 164—54)

The object of the present invention is a clipping machine, specially but not exclusively for cutting veneers.

The clipping machines used up till now for cutting non-metals, specially wood, as, e. g. the well-known veneer clippers, had but one movable knife. Pressing the chamfer of this knife into the work piece caused, at the end of the cutting process, a tearing out of material from that portion of the work piece lying at the side of the cutting surface of the knife. Hence, the cuts were not clean, which was specially annoying in the case of veneers.

The clipping machine according to the invention remedies these inconveniences. It is characterised in that it comprises a main knife and an auxiliary knife.

In this machine the auxiliary knife, towards the end of the cutting process, has already cut the work piece before the chamfer of the main knife had the opportunity to tear out material from the portion of the work piece lying at the side of the cutting surface of the knives. In this way, the cut becomes very clean.

In a preferred embodiment the knives are movably arranged in such a way that they carry out a drawing, cutting movement. The two knives lying opposite each other are preferably driven by a common member. In this way, a mutual position of the paths of the two knives is obtained, which always remains exactly the same. Furthermore, clashing together of the two knives is avoided.

With the clipping machine according to the invention the work pieces may be cut satisfactorily even in the direction of fibre without running the risk of being split, because the cut of the work piece made by the auxiliary knife prevents any splitting effect of the main knife.

Other objects and features will be apparent as the following description proceeds, reference being had to the accompanying drawings in which Figs. 1a and 1b are a front view from the side opposite to the clipper knives.

Figs. 2a and 2b are a plan view of the machine,

Fig. 4 is an enlarged section along the line IV—IV of Fig. 1,

Fig. 5 shows a detail of the drive for the pressure beam,

Fig. 6 is a section along the line VI—VI of Fig. 5,

Fig. 7 is a front view of the disengaging clutch of the drive for the clipper knives, Fig. 8 is a section along the line VIII—VIII of Fig. 7, Fig. 9 shows the position of the clutch pin when the crankshaft is engaged, Fig. 10 illustrates in a schematic way the course of the curves run through by the two clipper knives.

Figure 3:
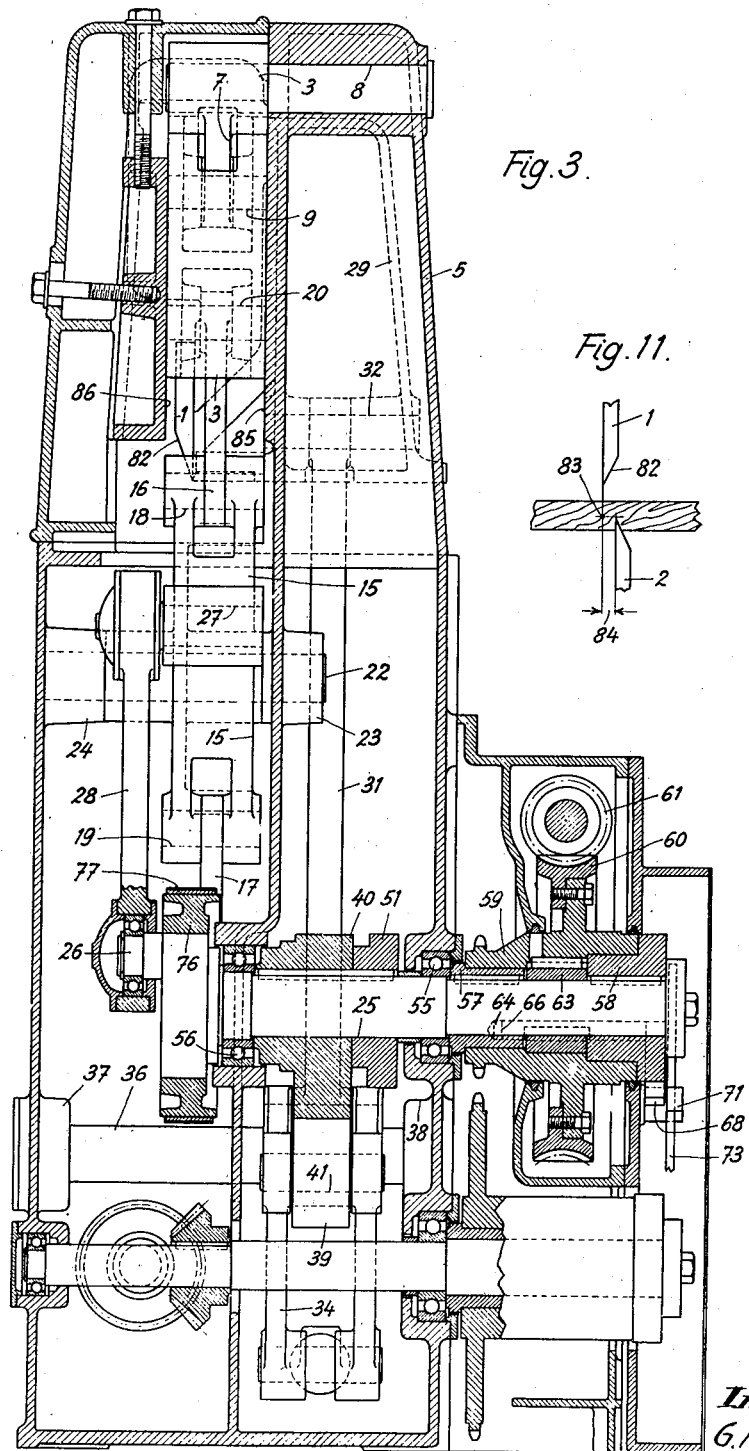
Fig. 3 is an enlarged section along the line III—III of Fig. 1.

The upper knife 1 forming the main knife, and the lower knife 2 lying opposite the knife 1 and forming the auxiliary knife are fixed to the movable knife holders 3, 4 respectively. The main knife 1 is fixed to the holder 3 with its cutting edge preferably ascending from left to right in Figs. 1a and 1b. These holders are guided in the frame parts 5 and 6, viz.: the knife holder 3 by the surfaces 85, 86 (Figs. 2a and 2b) and the holder 4 by the surfaces 87, 88 (Fig. 4). The upper knife holder 3 is pivotally suspended on the frame parts 5 and 6 by means of the links 7 and the bolts 8 and 9, while the lower knife holder 4 is carried by the levers 11 and 12 by means of the bolts 10. These levers are pivotally mounted on the eyes 13 of the machine frame by means of the eccentric pins 14 (Figs. 1a, 1b and 4). These pins 14 have flats 91 (Fig. 4) serving as working surfaces for a wrench for the purpose of turning the eccentric pin. By such turning the position of the levers 11, 12 and thus the position of the auxiliary knife 2 can be changed, whereby the depth of the cut of the lower knife 2 can be adjusted. Motion is imparted to the knife holders 3 and 4 by the lever 15 through the rods 16, 17. These rods are pivotally fixed to the lever 15 by means of the bolts 18 and 19 respectively, and to the holder 3 and lever 11 by means of the bolts 20 and 21 respectively. The lever 15 is rotatably mounted on the bearings 23, 24 of the frame part 5 by means of the pivot 22 (Fig. 3). The lever 15 is driven by the crankshaft 25 (Fig. 3) and by the crank rod 28 connecting the crank pin 26 with the bolt 27 of the lever 15. The disengageable drive of the crankshaft 25 will be described later on.

In the frame parts 5 and 6 the pressure beam 29 is also guided and that by the surfaces 89, 90 (Figs. 2a and 2b). It serves the purpose of pressing the work piece to be cut, e. g. a veneer, towards the table 30 (Fig. 4) and of holding it fast while cutting. This pressure beam 29 is carried by the rods 31 pivotally connected with the pressure beam by means of bolts 32 and with the bent levers 34, 35 respectively by means of the bolts 33. The bent lever 34 is mounted on the bearings 37, 38 of the frame part 5 by means of the shaft 36 (Figs. 3, 4). Besides, it carries a roller 39 by means of a bolt 41, said roller cooperating with a cam disc 40 attached to the crankshaft 25, as may specially be seen in Fig. 6. The bent lever 35 is operated by the bent lever 34 with the aid of the rod 42 which is pivotally connected with the bent levers by bolts. This rod comprises two parts coupled with each other by a sleeve 43 having right- and left-handed threads. By turning the sleeve 43 the mutual position of the bent levers 34 and 35 can be adjusted. The rod 42 is surrounded by a spring 44 which, at the one end, bears against a disc 45 fixed to the rod and, at the other end against a sleeve 47 adjustable by a nut 46. By turning the nut 46 on the thread 48 of the rod, the tension of the spring 44 pressing the roller 39 against the cam disc 40 may be changed. The tube 49 serves the purpose of protecting the spring 44 on the outside. Referring to Figs. 5 and 6 the pawl 50 cooperating with the disc 51 mounted on the crankshaft 25 and being loosely positioned on the bolt 52 fixed to the frame part 5, prevents the disengaged crankshaft from revolving back in a clockwise direction under the influence of the spring 44, in that the pawl 50 blocks the disc 51. For this purpose a torsion spring 53 constantly presses the pawl 50 against the disc 51. At the one end, this torsion spring is fixed to a disc 54 of the bolt 52 and, at the other end, to the pawl 50 itself.

The disengageable drive of the crankshaft 25 will now be described as follows (Figs. 3, 7, 8):

The crankshaft 25 runs on the ball bearings 55, 56 mounted on the frame part 5. Bushings 57 and 58 are keyed on the crankshaft 25. On these bushings the hub 59 of the worm wheel rim 60 engaging the driving worm 61 is loosely placed. The latter is driven by a non-illustrated prime mover and by a cone belt drive through a belt pulley 62 (Figs. 1a and 2a). Loosely on the crankshaft 25, but keyed on the hub 59 is a driving sleeve 63 of the pin clutch described as follows: The bushings 57 and 58 and the crankshaft 25 have a common bore 64 with its axis parallel to the crankshaft 25. The driving sleeve 63 has three grooves 65, whose radius is equal to that of the bore 64 and which at each revolution of the idly running sleeve 63, are once in line with the bore 64. A rotatable pin 66 is placed in the bore 64 with running fit. This pin, within reach of the bushings 57, 58, is cylindrical, within reach of the driving sleeve 63, however, it has the hatched cross section 67 (Fig. 7). A pawl 68 is fixed to the pin 66 and is under the influence of a spring 69 fixed to it and to a flange of the bushing 58. The pawl 68 may be operated by means of the lever 71 pivotally mounted on the clutch casing 70, a spring 72 fixed to the casing 70 acting on said lever 71. A rod 73, operated either by hand or automatically, cooperates with the lever 71.

This pin clutch works as follows:

The driving sleeve 63, seen in Fig. 7, rotates in an anticlockwise direction. As long as the pawl 68 is held by the lever 71 in the position shown in Fig. 7, the portion of the pin 66 having the hatched cross section 67, is entirely in line with the bore 64 of the crankshaft 25, i. e., it does not enter any of the grooves 65 of the driving sleeve 63. This, however, means that the sleeve 63 rotates idly, that the crankshaft 25 is, therefore, at rest. If the rod 73 is not drawn downwards in any way, e. g. by hand or by an automatic control mechanism, the lever 71 is swung out of reach of the pawl 68. As long as none of the grooves 65 of the rotating driving sleeve 63 are within reach of the pin 66, the pawl 68, though released by the lever 73, remains in the position shown in Fig. 7. However, as soon as one of the grooves 65 is within reach of the pin 66, the pawl 68 and, with it, the pin 66 are turned in an anticlockwise direction, until the pawl 68 strikes against the stopping surface 74. Then the pin portion with the cross section 67 takes the position shown in Fig. 9. Now this portion has entered one of the grooves 65 of the driving sleeve 63 and, together with the crankshaft 25 and the bushings 57, 58, is now taken along. The crankshaft 25 rotates as long as the lever 71 is not returned into the position shown in Fig. 7. If the lever 71 is released, be it by disengaging the notch 75 of the rod 73 from lever 71 or by lifting the rod 73, the spring 72 draws the lever 71 back into the position shown in Fig. 7. Now the pawl 68, on its rotation, will strike against this lever 71 and will be returned into the position shown in Fig. 7. Now the crankshaft 25 is again disengaged. In order to prevent the disengaged parts from moving on temporarily owing to the inertness of the moving parts, the crank disc 76 (Fig. 3) is formed as the brake disc of a band brake, around which the brake band 77 is laid, which, at its two ends, is screwed to the frame part 5, the one screw 78 (Fig. 1a) serving as adjusting screw for the band tension which must be so great that the brake stops the disengaged parts at once. It is understood that any other suitable clutch can be used instead of a pin clutch.

The manner of action of the illustrated clipping machine is as follows:

Supposing that the knife holders 3 and 4 and the pressure beam 29 and their drives are in the position shown in the drawings, i. e. the knives 1 and 2 are open. The work piece to be cut, e. g. a veneer, may be brought between the knives on the table 30. Now the pawl 68 is released by means of the rod 73 and the lever 71. The pin 66 engages the nearest groove 65 and the crankshaft 25, seen in Fig. 1a, commences to rotate in an anticlockwise direction. On the cam disc 40 rotating, the roller 39, under the effect of the spring 44, runs first along the curve portion AB of the disc 40. At B the roller has reached the smallest radius of the cam disc. The lever 34 has brought the rods 31 and thereby the pressure beam 29 into the lowest position. Now, the pressure beam presses the veneer against the table 30 so that it is fixed for cutting. In the time within which the crankshaft 25 has thus revolved by the angle $\alpha$, the crank pin 26 has passed from its position $a$ at the right of the upper dead centre into the position $b$ at the left of the upper dead centre. The lever 15 driven by the crank rod 28 thus remains practically in the same position. Thus the two knives 1 and 2 have not yet approached each other. Not till now, when the crank pin 26 moves from $b$ to the lower dead centre, the crank rod 28 drives the lever 15 in an anticlockwise direction. The rod 16 draws the upper knife holder 3 to the left whereby the individual points of the cutting edge of the main knife 1 describe arcs whose radius is equal to the length of the links 7 between the axes of the bolts 8 and 9. At the same time the rod 17 swings the lever 11 in an anticlockwise direction. Each point of the cutting edge of the auxiliary knife 2 describes thereby an arc whose radius is equal to the distance of the bolts 10 and 14 of the lever 11 from each other.

The mechanism transmitting the movement of the crank pin 26 to the knife holders is chosen so that the mutual position of the paths of the upper and lower cutting edges is approximately that illustrated in Fig. 10. Fig. 10 merely serves the purpose of showing the manner of action of the knives. Therefore, it is purely schematic and is not in exact relation to the size of the machine illustrated. 79 is the path of the cutting edge of the main knife 1 and 80 that of the auxiliary knife 2. 81 designates the work piece to be cut, lying on the table 30. The points C and D are the initial positions of the knives, i. e. the positions illustrated in Figs. 1a, 1b and 4. When the crank pin 26 now moves from b to the lower dead centre (Fig. 1a), it is, at first, the auxiliary knife which comes into contact with the work piece, and that in point E. It cuts the work piece from below in drawing movement from right to left to the point F; from this point onwards it moves downward up to the point G and out of the work piece. The main knife only comes into contact with the work piece at point H, that is, only when the auxiliary knife 2 has already left the work piece. From H it runs on up to the dead centre J and, in this period, cuts the work piece 81 entirely through in a drawing movement from right to left in Figs. 1a, 1b. It is understood that the paths of the knives must not intersect each other, otherwise the knives would clash. When the crank pin 26 moves from the lower dead centre upwards, the knives run back along their paths 79, 80 into the positions C and D. The pressure beam 29, by the ascending curve K—A of the cam disc 40, is lifted off from the work piece and the latter can be removed. It is understood that the mutual position of the points shown in Fig. 10 might be another one. The upper knife, e. g., might begin to cut, before the lower knife has entirely left the work piece etc. This depends principally on the width of the work piece to be cut by the machine.

Figure 11:
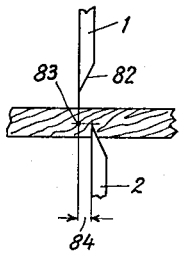
Fig. 11 shows a pecularity in the mutual position of the clipper knives.

From the above it is to be seen that the chamfer 82 of the knife 1 can no longer tear out material from the work piece at the lower surface, because the auxiliary cut made by the lower knife 2 prevents this. The cutting edges of the two knives 1 and 2 must not lie in exactly the same vertical plane, the edge of the upper knife may, seen in Fig. 4, be displaced somewhat to the left with regard to the lower edge, as is indicated in Fig. 11. Here too, tearing out material from the lower side of the work piece is impossible, as the upper knife, from point 83 on, has only to cut off the narrow prominence 84. This fact facilitates the assemblage. No care need be taken that the cutting edges are in the same vertical plane, but it is only necessary to see that the upper cutting edge, seen in Fig. 4, does not lie on the right side of the lower one. With the machine shown, work pieces may be cut satisfactorily even in the direction of fibre, because the lower knife first cutting the work piece, a splitting effect of the upper knife is impossible. As the upper knife is fixed to its holder ascending from left to right (Figs. 1a and 1b) cutting does not take place simultaneously over the whole knife length, which increases the cutting capacity. As the inclination of the upper knife is but slight with regard to the knife length, it is not visible in the drawing.

New is also the fact that the knives do not turn the chamfered side but the cutting surface side towards the knife holders.

The clipping machine, besides wood, may also cut other non-metals.

The main knife 1 might also be arranged at the bottom and the auxiliary knife 2 at the top.

What I claim is:

1. In a clipping machine, a main knife, an auxiliary knife, a frame, a first holder carrying said main knife, swingingly mounted on said frame, a second holder carrying said auxiliary knife, swingingly mounted on said frame, a common member to swing said first holder and said second holder, and a crank drive to drive said common member.

2. In a clipping machine, a main knife, an auxiliary knife, a frame, a first holder carrying said main knife, swingingly mounted on said frame, a second holder carrying said auxiliary knife, swingingly mounted on said frame, a common member to swing said first holder and said second holder, a base, a pressure beam adapted to press a work piece against said base, and a crank drive comprising a shaft and a cam disc mounted on said shaft to control said pressure beam.

3. In a clipping machine, a main knife, an auxiliary knife, a frame, a first holder carrying said main knife, movably mounted on said frame, a second holder carrying said auxiliary knife, movably mounted on said frame, a drive mechanism to drive said holders, a clutch to control said drive mechanism, comprising a driving part, a driven part, and a pin revolvably mounted on said driven part and adapted, by rotation, to be brought in and out of engagement with said driving part.

4. In a clipping machine, a main knife, an auxiliary knife, a frame, a first holder carrying said main knife and arranged in said frame, a second holder carrying said auxiliary knife and arranged in said frame, means mounting the second holder and the related auxiliary knife to swing in an arc at one side of the work piece to penetrate a part only of the width of the latter and to leave the work piece at the same side, means mounting the first holder and the related main knife to swing in an arc to penetrate the whole width of the work piece, and means for driving the knives in timed relation whereby the work penetrating movement of the auxiliary knife precedes the pentrating movement of the main knife.

5. In a clipping machine, a main knife, an auxiliary knife, a frame, a first holder carrying said main knife and arranged in said frame, a second holder carrying said auxiliary knife and arranged in said frame, means mounting the second holder and the related auxiliary knife to swing in an arc at one side of the work piece to penetrate a part only of the width of the latter and to leave the work piece at the same side, and means mounting the first holder and the related main knife to swing in an arc to penetrate the whole width of the work piece.

GOTTFRIED MAURER.